United States Patent [19]

Roberts

[11] 4,159,966
[45] Jul. 3, 1979

[54] CHROMATOGRAPHIC COLUMN PACKING

[75] Inventor: Charles B. Roberts, Midland, Mich.

[73] Assignee: The Dow Chemical Company, Midland, Mich.

[21] Appl. No.: 864,414

[22] Filed: Dec. 27, 1977

[51] Int. Cl.$^2$ ............... B01J 31/02; B01D 15/08
[52] U.S. Cl. ............... 252/430; 252/428; 55/67; 55/386; 210/31 C; 210/198 C; 260/650 R; 252/431 R; 252/431 N; 427/220
[58] Field of Search ............... 252/428, 430, 431 R, 252/431 H, 455 R, 432; 55/67, 386; 210/31 C, 198 C; 427/219, 220

[56] References Cited
U.S. PATENT DOCUMENTS

| | | | |
|---|---|---|---|
| 2,829,981 | 4/1958 | Shapiro | 427/219 |
| 3,146,209 | 8/1964 | Byrne et al. | 252/455 R |
| 3,274,120 | 9/1966 | Aftandilian | 252/441 |
| 3,557,531 | 1/1971 | McKinney | 55/67 |
| 3,725,302 | 4/1973 | Shimely et al. | 252/431 R |
| 3,808,125 | 4/1974 | Good | 210/198 C |
| 3,817,931 | 6/1974 | Brooks et al. | 252/432 |
| 3,956,179 | 5/1976 | Sebestian et al. | 252/428 |

OTHER PUBLICATIONS

Journal of Chromatography, 135 pp. 261–272 (1977) by Sadao Mori.

Primary Examiner—Winston A. Douglas
Assistant Examiner—P. E. Konopka
Attorney, Agent, or Firm—G. R. Baker

[57] ABSTRACT

A gas or liquid chromatographic column packing material prepared by reacting an activated, i.e., active hydrogen-containing, silica and/or alumina support with a reactive hydrogen-containing partitioning agent. The activated silica and/or alumina support is prepared by reacting a Group III metal hydride (boron, aluminum, gallium or indium hydride) with a hydrated silica and-/or alumina (a siliceous or aluminaceous mineral having surface hydroxyl groups or a synthetic siliceous or alumina having surface hydroxyl groups). The support has hydrogen atoms attached to an aluminum, boron, gallium or indium atom which in turn is attached through oxygen to the silica and/or alumina. The hydrogen atoms will react with hydrogen of a hydroxyl, amine, thio, amide, or carbohydrate moieties of organic compounds, as for example, alcohols, polyols, polyglycol ethers, polyglycol amines, polyamines, aliphatic and aromatic amides, alkoxy amides, sugars and the like. The long-chain, high molecular weight compounds of these classes are often used as partitioning agents for chromatographic column packings.

8 Claims, No Drawings

CHROMATOGRAPHIC COLUMN PACKING

BACKGROUND OF THE INVENTION

Numerous investigators have reported the use of solid supports such as hydrated silicas or aluminas as reactive supports for various halides such as silicon tetrachloride to produce a solid having more reactive sites which will react with organic molecules used as partitioning agents in chromatographic separations. These partitioning agents are usually materials having hydroxyl, amine, thiol, amido, or carboxyl moieties.

The prior art bonded packings have been difficult to prepare since in many instances the by-products of the bonding reaction contaminate the packing, requiring many washings, etc.

It is therefore an object of the present invention to provide a bonded column packing having high temperature stability, high pH stability (through the ability to bond pH stable partitioning agents to the activated solid support), no contamination by side products, and one capable of varying the degree of partitioning agent content. In addition it is advantageous that the unsatisfied active sites of the support can be deactivated prior to final use as by adding a simple alcohol or the like.

These and other objects will become apparent to those skilled in the art to which the following specification and claims are directed.

BRIEF DESCRIPTION OF THE INVENTION

In accordance with the present invention a reactive solid having hydrogen reactive sites and produced as described hereinafter or in U.S. Pat. No. 3,146,209, is reacted with an organic compound having a reactive hydroxyl, thio, amide, carbohydrate or amine moiety at from about room temperature to about 100° C. The progress of the reaction is monitored by the hydrogen gas evolved. The reaction may be carried out neat or in the presence of a solvent for the organic compound.

The metal hydrides which will react with the supports employed in the present invention are boron hydride, aluminum hydride, gallium hydride and indium hydride. Although the latter two will react, they are far too expensive to be presently of commercial significance. The preferred metal hydrides are boron and aluminum with aluminum being the more preferred. These hydrides are readily prepared in the conventional manner from lithium aluminum hydride and aluminum chloride in diethyl ether (A. E. Finhold, A. C. Bond and H. I. Schlesinger, J.A.C.S., 69, 1199 (1947)) or boron trifluoride sodium borohydride in glyme, Brown, H. C., "Hydrobromation", W. C. Benjamin Inc., N.Y., 1962, p. 10. The reaction medium containing the metal hydride is readily separated from the lithium chloride or sodium tetrafluoroborate, respectively, produced in the reactions which halides precipitate and the reaction medium used in the reaction with the hydrated support.

The amount of organic compound employed is dependent on the activity of the solid support, i.e., how many hydrogen atoms remain after preparing the active solid and to what degree total substitution of these hydrogen atoms with the organic compound is desired. If all the reactive hydrogens are not reacted it is a simple matter to remove them by reaction with a second hydroxyl, thio, amide, amine, carbohydrate or the like reactive compound which has a characteristic separate from that of the first compound. For example, in the preparation of a chromatographic column packing it is usually advantageous to react methanol or ethanol with the activated support to deactivate any unreacted hydrogen atoms of said hydride moieties on the support.

Solids prepared by reacting a polyglycol of molecular weight of about 400 in toluene with the activated support yield a chromatographic column packing which has a higher maximum stability temperature than a non-bonded column of the precursor support and the same polyglycol. In addition, in the separation of benzene, monochlorobenzene and the o-, p-, m-dichlorobenzenes the separation was more pronounced and sharper (reduced tailing) using the here prepared bonding packing than the non-bonded packing.

Other glycols, glycol ethers, thiols, and amines having molecular weight of 200 to several thousand, known as useful as partitioning agents, may be reacted with equally effective results to yield a myriad of column packings for both gas and liquid phase chromatographic separations. These products will all have higher maximum temperature stability and freedom from contaminants, by-products and the like than bonded or unbonded packings of the prior art for each enumerated partitioning agent. In addition the chromatographic packing is capable of use over a wider pH range than existing bonded column packings.

DETAILED DESCRIPTION OF THE INVENTION

Preparation of Activated Support

Two hundred milliliters of 0.2 molar aluminum hydride in diethyl ether was prepared by reacting one mole of aluminum chloride with three moles of lithium aluminum hydride in diethyl ether from which the by-product lithium chloride was removed by filtration. To the filtrate (diethyl ether containing aluminum hydride dissolved therein) was added 10 grams of Porasil A, a synthetic porous silicate containing surface hydroxyl groups. The addition was accompanied by copious release of hydrogen. Upon substantial completion of the hydrogen evolution, the solids were filtered from the solution, washed three times to remove unbonded aluminum hydride and dried under nitrogen.

EXAMPLE 1

Two grams of Carbowax 400 was dissolved in 100 milliliters of dry toluene at 60° C. and to this solution was added 4 grams of activated support prepared above at 25° C. There was a vigorous evolution of hydrogen which quickly subsided, but the reaction evidenced by the slow evolution of hydrogen continued at a slow rate. The support was allowed to remain in the Carbowax 400/toluene solution for eighteen hours after which the excess Carbowax 400/toluene solution was decanted off. The Carbowax 400 bonded support was washed three times with boiling toluene (approx. 110° C.), twice with methanol at 25° C., twice with methylene chloride at 25° C. and dried at 25° C. under vacuum.

A 6-foot silated glass column was packed with the Carbowax 400 bonded support, installed in a gas chromatography instrument and it was conditioned for 15 hours at 220° C. The column exhibited baseline separation at isothermal operation at 215° C. for all three isomers of dichlorobenzene. This operating temperature was 105° C. above the maximum recommended operating temperature of a non-bonded column.

EXAMPLE 2

Twenty five grams of Carbowax 20 M (average MW 20,000) was dissolved in 100 ml of dry toluene at 60° C. and to this solution was added 10 grams of activated support prepared as in preparation above using Porasil E in place of Porasil A. There was a release of hydrogen which quickly subsided. After standing overnight the Carbowax 20 M bonded support was washed with boiling toluene, and air dried.

A 6-foot glass column was packed with the bonded Carbowax 20 M support, installed in a gas chromatography instrument and conditioned at 220° C. for 15 hours. Temperature was programmed between 70° C. and 190° C. at 8° C./minute. Complete separation of the three isomers of dichlorobenzene was obtained.

In a similar manner by reacting a polyglycol amine or amide, e.g., of molecular weight about 200, with an activated support such as described in Preparation A, there is prepared a column packing having improved but similar characteristics to the unbonded packing of the same amine and an unactivated support of the same.

What is claimed is:

1. A chromatographic column packing comprising a chemically bond chromatographic partitioning agent selected from the group consisting of aliphatic alcohols, aliphatic polyols, polyglycol ethers, polyglycol amines, polyamines, aliphatic and aromatic amides thio-compounds and alkoxy amides, having molecular weights of from about 200 to 20,000, and sugars bonded through O, S or N to a Group III metal atom which is bound to a silica and/or alumina support through oxygen said group III metal having been incorporated into the structure as a metal hydride and having any hydrogen atoms not replaced by said partitioning agent replaced with a low molecular weight, below 200, alcohol.

2. The packing of claim 1 wherein the Group III metal is aluminum and the partitioning agent is a liquid polyglycol ether having a molecular weight (MW) of from 200 to about several thousand.

3. The packing of claim 2 wherein the polyglycol has a MW of about 400.

4. The packing of claim 2 wherein the polyglycol has a MW of about 20,000 (20 M).

5. The packing of claim 1 wherein the Group III metal is boron and the partitioning agent is a polyglycol ether liquid having a MW of from 200 to about several thousand.

6. The packing of claim 1 wherein the Group III metal is gallium and the partitioning agent is a polyglycol ether liquid having a MW of from 200 to about several thousand.

7. The packing of claim 1 wherein the Group III metal is indium and the partitioning agent is a polyglycol ether liquid having a MW of from 200 to about several thousand.

8. A method for preparing bonded chromatographic column packings comprising reacting by contacting an active hydrogen containing silica, alumina or silica-alumina solid support which has been modified by reaction with a Group III metal hydride selected from the group consisting of aluminum, boron, gallium or indium then reacted with a chromatographic partitioning agent selected from the group consisting of aliphatic alcohols, aliphatic polyols, polyglycol ethers, polyglycol amines, polyamines, aliphatic and aromatic amides and alkoxy amides, having molecular weights of from about 200 to 20,000, and sugars neat or in the presence of an inert solvent at from about room temperature to about 100° C. until the evolution of hydrogen is ceased, said partitioning agent being employed in amounts to react with from a few to all of the activated sites on said activated support, and reacting any unreacted hydrogen atom sites of said Group III metal hydride with a low molecular weight, below 200, compound of the class afore set forth.

* * * * *

UNITED STATES PATENT AND TRADEMARK OFFICE
CERTIFICATE OF CORRECTION

PATENT NO. : 4,159,966
DATED : July 3, 1979
INVENTOR(S) : Charles B. Roberts

It is certified that error appears in the above-identified patent and that said Letters Patent are hereby corrected as shown below:

Column 1, line 49; change "Finhold," to --Finholt,--.

Column 2, line 13; change "ing" to --ed--.

Column 2, line 15; change "weight" to --weights--.

Column 3, line 25; change "bond" to --bound--.

Column 3, line 28; change "amides" to --amides,--.

Signed and Sealed this

Twenty-third Day of October 1979

[SEAL]

Attest:

RUTH C. MASON
Attesting Officer

LUTRELLE F. PARKER
Acting Commissioner of Patents and Trademarks